(12) United States Patent
Wang

(10) Patent No.: US 6,404,169 B1
(45) Date of Patent: Jun. 11, 2002

(54) AUTO-CONTROLLER FOR BATTERY CHARGER USING THERMO-CONTROL AND CURRENT BALANCE TECHNOLOGY

(76) Inventor: Randall Wang, 4978 Santa Anita Ave., Temple City, CA (US) 91780

( * ) Notice: Subject to any disclaimer, the term of this patent is extended or adjusted under 35 U.S.C. 154(b) by 0 days.

(21) Appl. No.: 09/940,149

(22) Filed: Aug. 23, 2001

(51) Int. Cl.[7] .............................................. H01M 10/46
(52) U.S. Cl. ....................................................... 320/150
(58) Field of Search ................................ 320/127, 128, 320/133, 137, 150, 153, 155

(56) References Cited

U.S. PATENT DOCUMENTS 4,513,238 A * 4/1985 Orban
4,642,600 A * 2/1987 Gummelt et al.
4,816,737 A * 3/1989 Delmas et al

* cited by examiner .

Primary Examiner—Edward H. Tso
(74) Attorney, Agent, or Firm—Raymond Y. Chan; David and Raymond Patent Group

(57) ABSTRACT

An auto-controller is adapted for incorporating with a battery charger to charge a battery by using a thermo-control and current balance technology for extending a service life span of the battery while being cost effective. The auto-controller includes a resistor having a predetermined resistance for electrically connecting to the battery charger wherein the resistor generates heat when a predetermined current flows through that defines a reference temperature for the battery charger, and a thermo sensor operatively positioned adjacent to the resistor for detecting the reference temperature and selectively switching the battery charger on and off, whereby when the reference temperature is above a control temperature preset in the thermo sensor, the battery charger is switched off to not function and when the reference temperature is below the control temperature, the battery charger is maintained in a switch-on condition to continuously charge a battery.

29 Claims, 4 Drawing Sheets

AUTO-CONTROLLER FOR BATTERY CHARGER USING THERMO-CONTROL AND CURRENT BALANCE TECHNOLOGY

BACKGROUND OF THE PRESENT INVENTION

1. Field of Invention

The present invention relates to battery chargers, and more particularly to an auto-controller for battery charger by using thermo-control and current balance technology.

2. Description of Related Arts

Batteries are known that can store electrical energy and play a main role in power tools, toys, portable electrical appliances, and transportation such as vehicles, boats and airplanes. Battery is mainly used to initially start up the engine and supply electrical energy to the accessories such as electronic communication. Therefore, the battery must be in a good condition and in fully charge manner since the non-fully charged battery will be discharged or become so called "dead" when it is not in use for a period of time.

A conventional standard charger is used for charging up the battery wherein the standard charger provides a constant current in, for example, a pulse manner and a fixed duration to the battery as shown in FIGS. 1A, 1B, 2A, and 2B. However, the conventional standard charger has the several drawbacks. The standard charger cannot determine the battery either in a half-full or fully charged condition. The standard charger will apply the relative high current to an empty battery until it is overcharged, which may damage the battery. In other words, no matter what is the condition of the battery, the battery will be considered as an empty battery to be charged by the pulse charger.

Besides, when a relative large current is applied to the battery, heat is generated, which may overheat the battery. Thus, when charging the battery, the electrochemical reaction taken place in the battery releases some poison gas such as sulfur dioxide. The lead plate inside the battery will be coated by the sulfates that reduces the effective of the battery. Such sulfates will function as an internal resistor of the battery for resisting the charging process and the discharging process of the battery. Therefore, the battery will be permanently damaged after a period of time.

Moreover, the effective of the battery will be reduced when the battery is overcharged. When the battery is fully charged, the standard charger still contribute the same amount of current into the battery such that the electrochemical reaction will keep taking place in the battery. Therefore, the reacting substances inside the battery will be reacted and reduced their quantity. The ideal charging process for the battery is to fill up the amount of electrical energy which has been used up in the battery.

SUMMARY OF THE PRESENT INVENTION

A main object of the present invention is to provide an auto-controller for battery charger by using thermo-control and current balance technology for extending a service life span of the battery while being cost effective.

Another object of the present invention is to provide an auto-controller for battery charger by using thermo-control and current balance technology, wherein the battery charger is capable of automatically switching on and off for charging the battery not only in dependence on the occurrence of the current but also when the temperature of the battery is overheated than a control temperature.

Another object of the present invention is to provide an auto-controller for battery charger by using thermo-control and current balance technology, which is responsive to both current overload and thermal overheat. Therefore, the battery charger is effective in operation.

Another object of the present invention is to provide an auto-controller for battery charger by using thermo-control and current balance technology, which can protect the circuit from being burnt. In other words, the current of the battery charger will be cut off by the auto-controller before it is burnt to damage the battery and the battery charger.

Another object of the present invention is to provide an auto-controller for batter charger by using thermo-control and current balance technology, wherein the autocontroller can be incorporated with a conventional battery charger without altering the original structure of the battery charger.

Accordingly, in order to accomplish the above objects, the present invention provides an auto-controller for battery charger by using thermo-control and current balance technology, which comprises:

a resistor having a predetermined resistance for electrically connecting to the battery charger wherein the resistor generates heat when a predetermined current flows through that defines a reference temperature for the battery charger; and a thermo sensor operatively positioned adjacent to the resistor for detecting the reference temperature and selectively switching the battery charger on and off, whereby when the reference temperature is above a control temperature preset in the thermo sensor, the battery charger is switched off to not function and when the reference temperature is below the control temperature, the battery charger is maintained in a switch-on condition to continuously charge a battery.

DETAILED DESCRIPTION OF THE PREFERRED EMBODIMENT

Figure 1A:
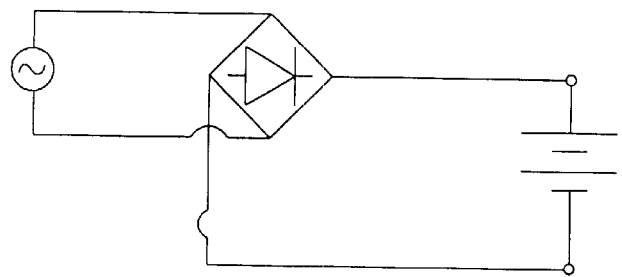
FIG. 1A is a circuit diagram of a first type conventional battery charger.
Figure 1B:
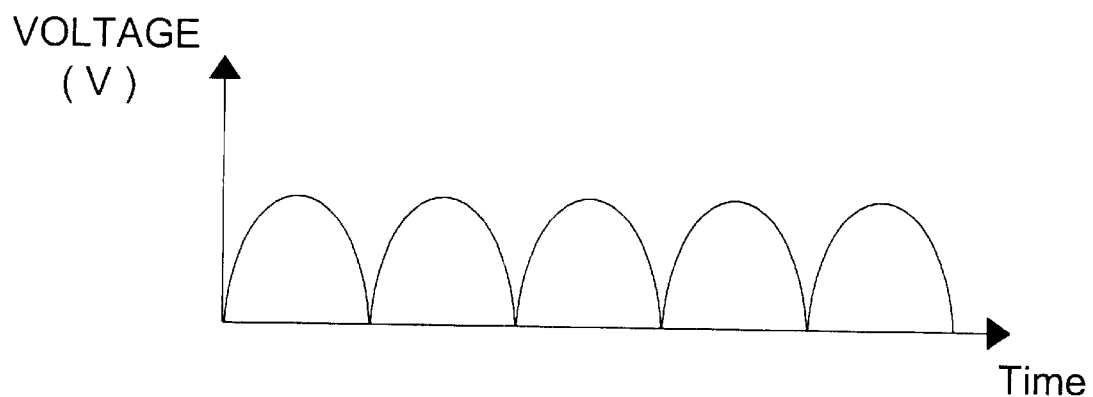
FIG. 1B is a diagram of the first type conventional battery charger.
Figure 2A:
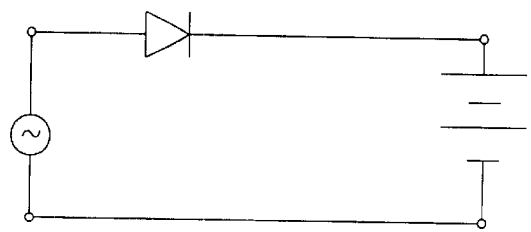
FIG. 2A is a circuit diagram of a second type conventional battery charger.
Figure 2B:
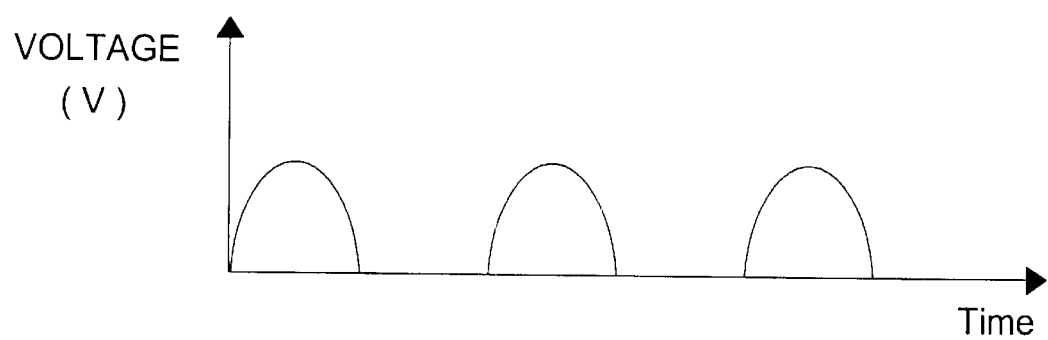
FIG. 2B is a diagram of the second type conventional battery charger.
Figure 3:
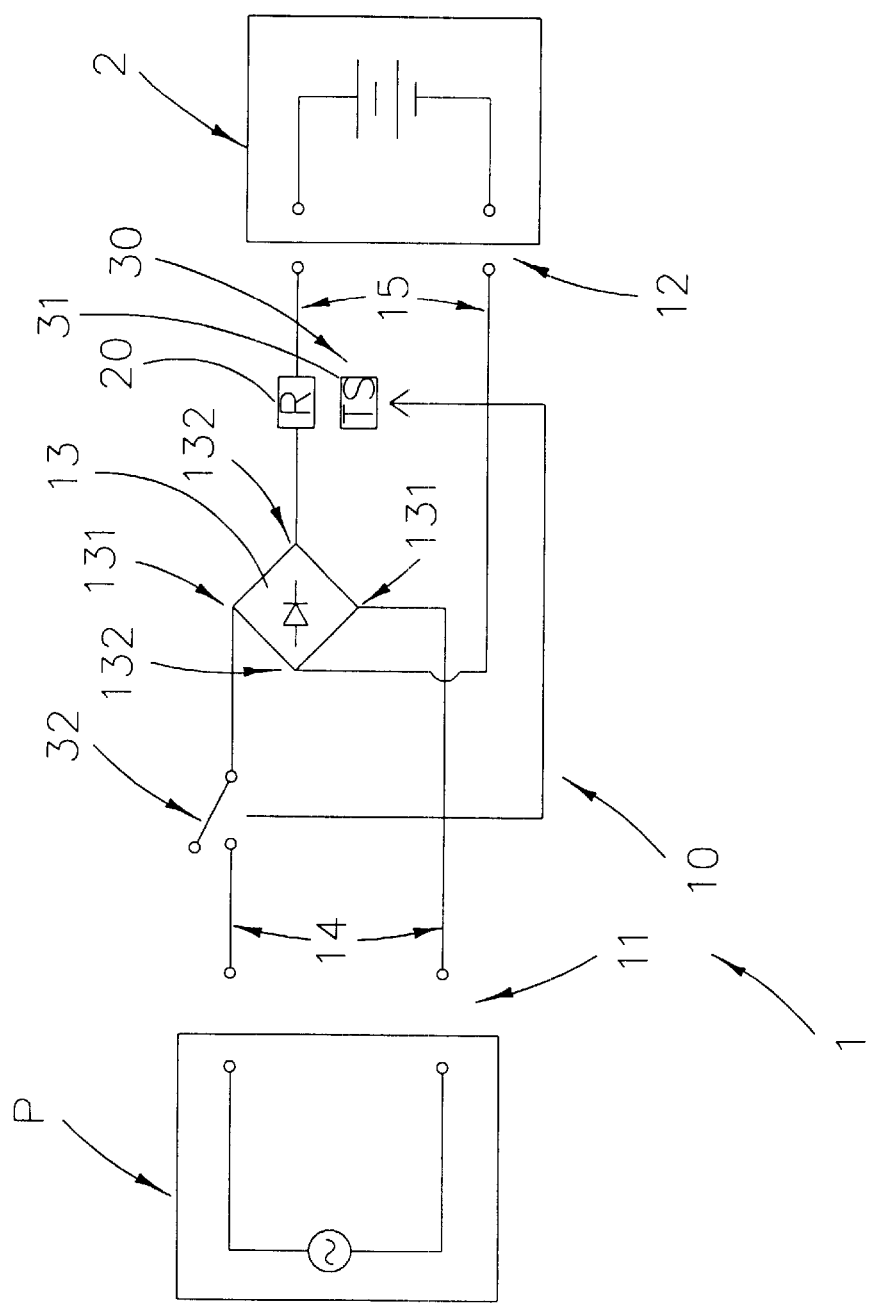
FIG. 3 is a circuit diagram of an auto-controller for battery charger by using thermo-control and current balance technology according to a preferred embodiment of the present invention.

Referring to FIG. 3, an auto-controller for battery charger 1 by using thermo-control and current balance technology according to a preferred embodiment of the present invention is illustrated. The battery charger 1 comprises a device circuit 10 which comprises a power input 11 adapted for electrically connecting to a power source P and a power output 12 for electrically connecting to a battery 2 such that the battery 2 can be charged when a current from the power source P passes through the device circuit 10.

Like a standard charger, the device circuit 10 generally comprises a bridge converter 13 having a pair of AC inputs 131 and a pair of DC outputs 132. The two AC inputs 131 are electrically connected to the power input 11 and the two DC outputs 132 are electrically connected to the power output 12 through input wires 14 and output wires 15.

The auto-controller comprises a heat generator which is a resistor 20 having a predetermined resistance of 4 to 8 ohm as embodied in the preferred embodiment. The resistor 20 is electrically connected to the device circuit 10 of the battery charger 1 in series and arranged in such a manner that when a predetermined current flows through the resistor 20, the resistor 20 generates heat which can be measured as a reference temperature $T_C$ for the battery charger 1.

Practically, the resistor 20 can be connected to one of the output wires 15, as shown in FIG. 3, so that when the electric current flowing through the resistor 20 increases, an environment temperature around the resistor 20 will increase accordingly.

The auto-controller further comprises a thermo sensor 30 operatively positioned adjacent to the resistor 20 for detecting a reference temperature $T_C$ which is the environment temperature around the resistor 20.

The auto-controller further comprises a thermo sensor 30 operatively positioned adjacent to the resistor 20 for detecting the reference temperature $T_C$ and selectively switching the battery charger 1 on and off. The thermo sensor 30 can be a bi-metal type heat sensor switch being positioned adjacent to the resistor 20 and also electrically connected to the device circuit 10 in series. Alternatively, the thermo sensor 30 can be embodied to comprise a heat sensor 31 positioned adjacent to said resistor 20 and an auto switch 31 electrically connected to one of the input wires 14, wherein the heat sensor 31 is electrically connected to the auto switch for selectively switching the battery charger 1 on and off.

In other words, the reference temperature $T_C$ will vary with respect to the current value proportionally; the reference temperature $T_C$ is also directly proportional to the resistor 20 when the current is constant; and the reference temperature $T_C$ increases when using a larger ohm of the resistor 20, which can be determined by calculation.

Therefore, when the reference temperature $T_C$ is maintained below a control temperature $T_S$ preset in the thermo sensor 30, the battery charger 1 is maintained in a switch-on condition to continuously charge the battery 2. When the reference temperature $T_C$ rises above the control temperature $T_S$, the battery charger 1 is switched off to not function. When the reference temperature $T_C$ drops back from above the control temperature $T_S$ to below the control temperature $T_S$, the battery charger 1 is switched on to charge the battery 2 again.

The thermo sensor 30 should be positioned close to the resistor 20 for detecting the reference temperature $T_C$, wherein a detecting distance L is defined between the thermo sensor 30 and the resistor 20. The control temperature $T_S$ is preset in the thermo sensor 30 wherein the control temperature $T_S$ is defined that when the reference temperature $T_C$ is below the control temperature $T_S$, the current can effectively flow through the device circuit 10 under a safety condition. When the reference temperature $T_C$ is above the control temperature $T_S$, the heat may damage the device circuit 10. Therefore, the control temperature $T_S$ is a temperature for preventing the device circuit 10 being overheated. The control temperature $T_S$ is preferred to preset at the 57° C.

Accordingly, the control temperature $T_S$ can be controlled and preset by adjusting the detecting distance L between the thermo sensor 30 and the resistor 30. Generally, the longer detecting distance L between the thermo sensor 30 and the resistor 30 needs a higher control temperature $T_S$ of the thermo sensor 30.

The auto switch 40 is electrically connected to the device circuit 10 for selectively controlling the current flowing the device circuit 10. Accordingly, the battery 2 is charged within a plurality of durations D having different time lengths wherein each of the durations D is a length of the time of the device circuit 10 in a single on and off manner.

Figure 4:
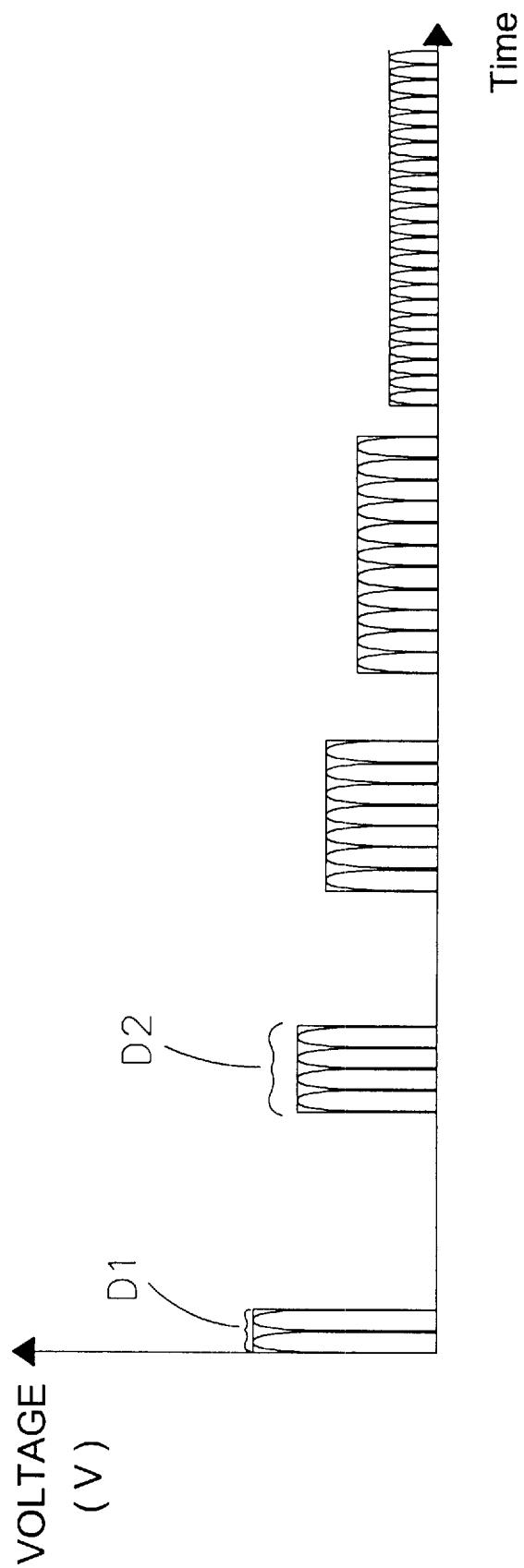
FIG. 4 is a diagram of the auto-controller for battery charger by using thermo-control and current balance technology according to the above preferred embodiment of the present invention.

As shown in FIG. 4, at the first duration D1, when the current is initially applied to the device circuit 10 and passes the resistor 20, heat is generated. Due to the relative high amplitude of the current, a large amount of heat is generated within a short period of time such that the reference temperature $T_C$ quickly reaches the control temperature $T_S$ and the auto switch 40 switches off the device circuit 10, so as to form an open circuit. When the reference temperature $T_C$ is cooled down below the control temperature $T_S$, the device circuit 10 is switched on for enabling the secondary current flowing through during the second duration D2. Since the secondary current has an amplitude smaller than the amplitude of the initial current, the second duration D2 is longer than the first duration D1 to reach the control temperature $T_S$. In other words, the current applied to the battery will be gradually reduced after every duration and each duration D is longer that the previous duration to reach the control temperature $T_S$.

Therefore, when the battery 2 is charged in an empty manner, the amplitude of the current is high to speed up the electrochemical reaction in the battery 2. When the battery 2 is half-fully charged, the amplitude of the current will be reduced to slowly charge the battery 2 until it is fully charged. In other words, in the entire charging process, the amplitude of the current is gradually reduced according to the condition of the battery 2 and the reduction of the reference temperature $T_C$ of the battery charger 1, so as to prevent the constant high current from continuously applying to the battery 2, which will damage the battery 2 and shorten the service life span thereof.

In view of above disclosure, the advantages of the auto controller of the present invention include the following:

1. Since the auto-controller can maintain the reference temperature of the battery charger under the control temperature to prevent the battery from being overheated during the charging process, the service life span of the battery can be further extended.

2. During the charging process, the amplitude of the current is gradually reduced while the duration increases such that no continued large current is input to the battery, which may damage the battery.

3. The structure of the auto-controller is simple and relative in low cost. So, no expensive or complicate mechanical structure is required to employ in the auto controller such that the present invention successfully provides an economic and efficient solution for preventing the battery from being overheated.

4. The auto-controller can be easy install into or incorporated with any kind of conventional battery charger without altering the original structure thereof, so as to minimize the manufacturing cost of the conventional battery charger.

What is claimed is:

1. An auto-controller of a battery charger which comprises a device circuit for electrically connecting a battery with a power source, wherein said auto-controller comprises:

a resistor having a predetermined resistance for electrically connecting to said battery charger wherein said resistor generates heat when a predetermined current flows through that defines a reference temperature of said battery charger; and a thermo sensor, which is operatively positioned adjacent to said resistor, detecting an environment temperature of said resistor as said reference temperature of said battery charger and selectively switching the battery charger between a switch-on condition and a switch-off condition, wherein when said reference temperature is above a control temperature preset in the thermo sensor, the battery charger is switched to said switch-off condition to not function and when the reference temperature is below the control temperature, the battery charger is maintained in said switch-on condition to charge a battery.

2. The auto-controller, as recited in claim 1, wherein said thermo sensor is operatively positioned close to said resistor to define a detecting distance therebetween, wherein said detecting distance is capable of being adjusted for presetting said control temperature of said thermo sensor.

3. The auto-controller, as recited in claim 1, wherein said current flowing through said device circuit to said battery is gradually reduced when said reference temperature reduces in each charging duration which is a length of time of said device circuit in a single on and off manner.

4. The auto-controller, as recited in claim 2, wherein said current flowing through said device circuit to said battery is gradually reduced when said reference temperature reduces in each charging duration which is a length of time of said device circuit in a single on and off manner.

5. The auto-controller, as recited in claim 1, wherein said thermo sensor comprises a heat sensor positioned adjacent to said resistor and an auto switch for electrically connecting to said device circuit of said battery charger, wherein said heat sensor is electrically connected to said auto switch for selectively switching the battery charger between said switch-on condition and said switch-off condition.

6. The auto-controller, as recited in claim 2, wherein said thermo sensor comprises a heat sensor positioned adjacent to said resistor and an auto switch for electrically connecting to said device circuit of said battery charger, wherein said heat sensor is electrically connected to said auto switch for selectively switching the battery charger between said switch-on condition and said switch-off condition.

7. The auto-controller, as recited in claim 3, wherein said thermo sensor comprises a heat sensor positioned adjacent to said resistor and an auto switch for electrically connecting to said device circuit of said battery charger, wherein said heat sensor is electrically connected to said auto switch for selectively switching the battery charger between said switch-on condition and said switch-off condition.

8. The auto-controller, as recited in claim 4, wherein said thermo sensor comprises a heat sensor positioned adjacent to said resistor and an auto switch for electrically connecting to said device circuit of said battery charger, wherein said heat sensor is electrically connected to said auto switch for selectively switching the battery charger between said switch-on condition and said switch-off condition.

9. The auto-controller, as recited in claim 1, wherein said resistor has a predetermined resistance of 4 to 8 ohm.

10. The auto-controller, as recited in claim 5, wherein said resistor has a predetermined resistance of 4 to 8 ohm.

11. The auto-controller, as recited in claim 6, wherein said resistor has a predetermined resistance of 4 to 8 ohm.

12. The auto-controller, as recited in claim 1, wherein said control temperature is preferred to be 57° C.

13. The auto-controller, as recited in claim 5, wherein said control temperature is preferred to be 57° C.

14. The auto-controller, as recited in claim 6, wherein said control temperature is preferred to be 57° C.

15. The auto-controller, as recited in claim 9, wherein said control temperature is preferred to be 57° C.

16. The auto-controller, as recited in claim 10, wherein said control temperature is preferred to be 57° C.

17. The auto-controller, as recited in claim 11, wherein said control temperature is preferred to be 57° C.

18. A battery charger, comprising:
a device circuit which comprises a power input for electrically connecting to a power source and a power output for electrically connecting to a battery; and
an auto-controller, which is electrically connected with said device circuit, comprising:
a resistor having a predetermined resistance for electrically connecting to said device circuit wherein said resistor generates heat when a predetermined current flows through that defines a reference temperature of said battery charger; and
a thermo sensor, which is operatively positioned adjacent to said resistor, detecting an environment temperature of said resistor as said reference temperature of said battery charger and selectively switching the battery charger between a switch-on condition and a switch-off condition, wherein when said reference temperature is above a control temperature preset in the thermo sensor, the battery charger is switched to said switch-off condition to not function and when the reference temperature is below the control temperature, the battery charger is maintained in said switch-on condition to charge said battery.

19. The battery charger, as recited in claim 18, wherein said thermo sensor comprises a heat sensor positioned adjacent to said resistor and an auto switch electrically connected to one of said device circuit, wherein said heat sensor is electrically connected to said auto switch for selectively switching said battery charger between said switch-on condition and said switch-off condition.

20. The battery charger, as recited in claim 18, wherein said device circuit comprises a bridge converter having a pair of AC inputs and a pair of DC outputs, wherein said two AC inputs are electrically connected to said power input and said two DC outputs are electrically connected to said power output through input wires and output wires, wherein said resistor is electrically connected to one of said input and output wires, so that when said current flowing through said resistor increases, said environment temperature around said resistor increases accordingly.

21. The battery charger, as recited in claim 19, wherein said device circuit comprises a bridge converter having a pair of AC inputs and a pair of DC outputs, wherein said two AC inputs are electrically connected to said power input and said two DC outputs are electrically connected to said power output through input wires and output wires, wherein said resistor is electrically connected to one of said output wires, so that when said current flowing through said resistor increases, said environment temperature around said resistor increases accordingly, wherein said auto switch is electrically connected to one of said input wires for selectively switching on and off of said device circuit.

22. The auto-controller, as recited in claim 18, wherein said resistor has a predetermined resistance of 4 to 8 ohm.

23. The auto-controller, as recited in claim 19, wherein said resistor has a predetermined resistance of 4 to 8 ohm.

24. The auto-controller, as recited in claim 20, wherein said resistor has a predetermined resistance of 4 to 8 ohm.

25. The auto-controller, as recited in claim 21, wherein said resistor has a predetermined resistance of 4 to 8 ohm.

26. The auto-controller, as recited in claim 18, wherein said control temperature is preferred to be 57° C.

27. The auto-controller, as recited in claim 19, wherein said control temperature is preferred to be 57° C.

28. The auto-controller, as recited in claim 22, wherein said control temperature is preferred to be 57° C.

29. The auto-controller, as recited in claim 23, wherein said control temperature is preferred to be 57° C.

* * * * *